Jan. 10, 1967  W. E. McCARTHY  3,296,833
CONSTANT VELOCITY UNIVERSAL JOINT
Filed Oct. 12, 1964

INVENTOR.
William E. McCarthy
BY
J. L. Carpenter
ATTORNEY

United States Patent Office 3,296,833
Patented Jan. 10, 1967

3,296,833
CONSTANT VELOCITY UNIVERSAL JOINT
William E. McCarthy, Grand Blanc, Mich., assignor to General Motors Corporation, Detroit, Mich., a corporation of Delaware
Filed Oct. 12, 1964, Ser. No. 403,198
2 Claims. (Cl. 64—21)

This invention relates to universal joints and more particularly to double pot-type constant velocity universal joints.

To avoid the velocity fluctuations inherent in the well known Cardan and pot-type universal joints it is common to incorporate two such joints in one structure so that the fluctuations caused by each joint are out of phase and tend to cancel each other. A common joint of this type includes a pair of trunnions located on the ends of the driving and driven members and having their axes intersecting the axes of their respective members and forming right angles therewith. The ends of the members carrying the trunnions are then placed in an intermediate or pot member having an axial bore accommodating the ends of the members and the trunnions. Rollers or drive elements slidably and rotatably mounted on the trunnions transmit torque between the driving and driven members and the pot member.

To secure a constant velocity ratio with a joint of this type, it is necessary that the angle formed by the intersection of the axis of rotation of the driving member with the axis of rotation of the pot member be equal to the angle fromed by the axis of rotation of the pot member with the axis of rotation of the driven member. An equivalent condition is that the axial distance between the intersection point of the axes of rotation of the driving and driven members and the axes of their respective trunnions be equal. This may be accomplished by securing the driving and driven members to the pot member to prevent axial motion therebetween. Where it is not desirable to prevent axial motion between the driving and driven members it is necessary to provide some type of centering or angle equalizing means so that the joint will operate as a constant velocity joint.

One feature of this invention is to provide a constant velocity universal joint which permits axial motion between the driving and driven members. Another feature of this invention is to provide a double pot-type universal joint incorporating a non-torque transmitting centering means to assure operation of the joint at a constant velocity ratio while permitting axial motion between the driving and driven members.

These and other features of this invention will become more apparent from the following specification and drawings wherein.

Figure 1:
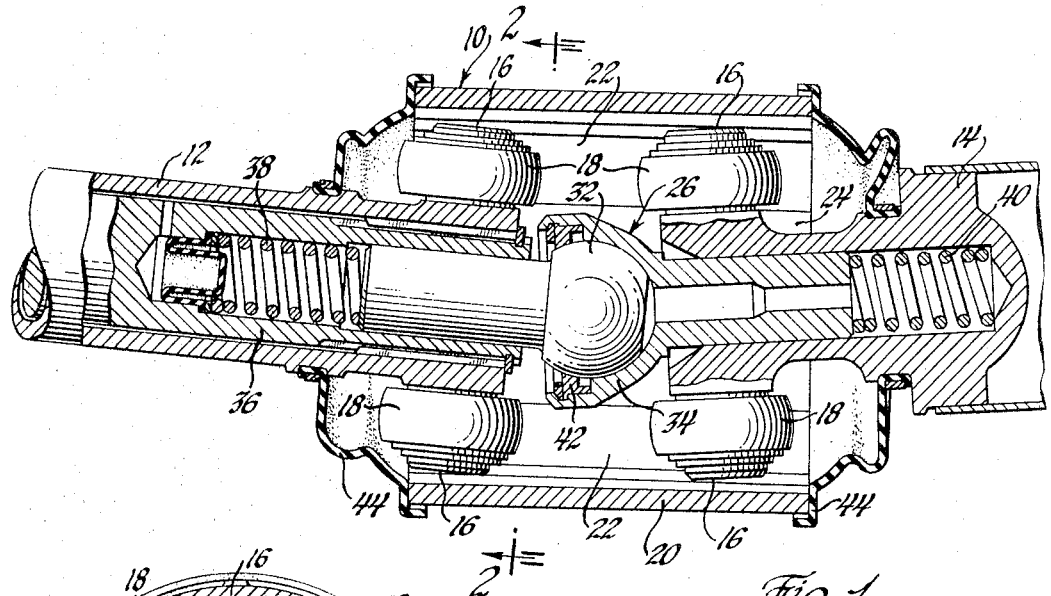
FIGURE 1 is a sectional elevational view of a double pot-type universal joint according to this invention, with the driving and driven members angularly disposed.
Figure 2:
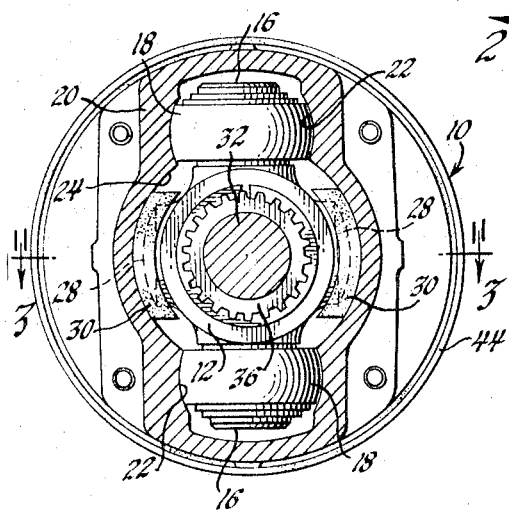
FIGURE 2 is a sectional view taken generally along the plane indicated by line 2—2 of FIGURE 1.
Figure 3:
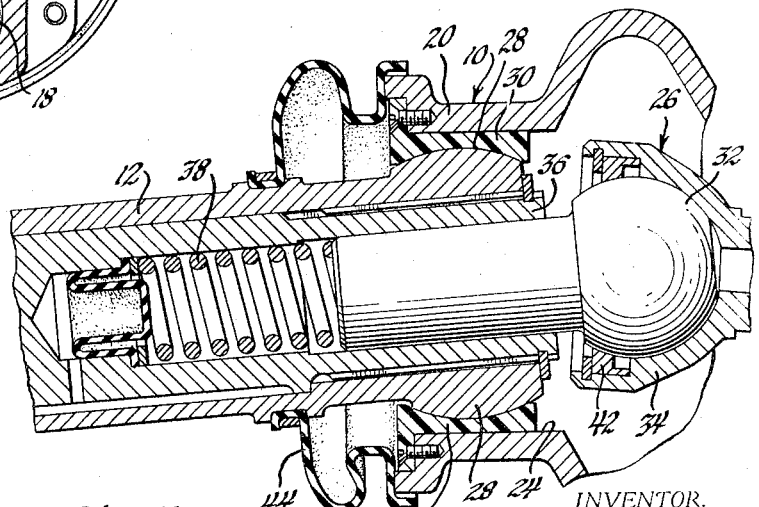
FIGURE 3 is a sectional view taken generally along the plane indicated by the line 3—3 of FIGURE 2.

Referring now to the drawings, a universal joint designated generally 10 includes members 12 and 14 either of which may be the driving or the driven member. Each member has secured thereto trunnions 16 which are cylindrically shaped and whose axes form right angles with the axes of the respective members. Slidably and rotatably mounted on each trunnion is a drive element or roller 18. The bore of the rollers may be sufficiently large to permit the use of anti-friction bearings, not shown, between the trunnions and the rollers, or the rollers, or the rollers may be mounted directly on the trunnions.

The trunnion carrying end of each member is enclosed within a pot member 20 which includes axial grooves 22 which are adapted to receive the drive elements and permit axial motion of these elements while preventing radial motion relative to the pot member. The central bore 24 of the pot member receives the ends of the members 12 and 14 and the centering means designated generally 26, which will be hereinafter described. Members 12 and 14 include spherically ended projections 28 having their axes intersecting and forming right angles with the axes of both the trunnions and the members. The projections 28 of the member 14 directly contact the central bore 24 of the pot member and prevent the member 14 from moving radially with respect to the pot member while permitting it to move axially. The projections 28 of the member 12 do not contact the bore 24 of the pot member but are received within spherically shaped recesses provided in a pair of bearing caps 30 secured to the pot member. These bearing caps permit the member 12 to move angularly with respect to the pot member but prevent the member 12 from moving radially or axially with respect to the pot member.

The centering means 26 includes a ball member 32 and a socket member 34. These members are telescopically received within the members 12 and 14, respectively. A liner 36 splined to member 12 permits ease of assembly. A spring 38 is provided in the liner to bias the ball member 32 into engagement with the socket member 34 which is biased outwardly of the member 14 by a spring 40. A retaining ring 42 secures the ball portion of the member 32 within the socket portion of the member 34. The joint is sealed at both ends of the pot member 20 with conventional seals 44.

The ball member 32 is telescopically mounted within the member 12 and is free to slide axially and rotate but is prevented from moving in a radial direction. Thus, the axis of the ball member is always coincident with the axis of the member 12. Similarly, the axis of the socket member 34 is always coincident with the axis of the member 14. Since the retaining ring 42 secures the ball member to the socket member and the axes of the ball and socket members are always coincident with the axes of the driving and driven members, the center of the ball and socket joint will always be coincident with the point of intersection of the axes of rotation of the driving and driven members.

To obtain a constant velocity ratio between the driving and driven members it is necessary that the angle formed by the axis of rotation of the driving member with the axis of rotation of the pot member be equal to the angle formed by the axis of rotation of the driven member with the axis of rotation of the pot member. This is equivalent to maintaining equal axial distances between the point of intersection of the axes of the driving and driven members and the axes of their respective trunnions. This is accomplished in the present invention by the springs 38 and 40 which locate the center of the ball portion of member 32 equidistant between the axes of the driving member trunnions and the axes of the driven member trunnions as measured along the axes of rotation of the driving and driven members. When the springs 38 and 40 are of the proper strength the joint will operate as a constant velocity universal joint while still allowing axial motion between the driving and driven members.

Thus, this invention provides an improved constant velocity universal joint.

I claim:

1. A double pot-type universal joint comprising a first drive member, a second drive member, each drive member including a pair of opposed trunnions, a pot member drivingly interconnecting the trunnions, the first drive member being angularly and axially movable relative to the pot member, means preventing axial movement of the second drive member relative to the pot member while permitting angular movement relative thereto, and articulated means slidably interconnecting the first and second drive members, the articulated means including a first pivot member slidably carried coaxially by the first drive member, a second pivot member slidably carried coaxially by the second drive member and pivotally connected to the first pivot member and means biasing each of the first and second pivot members outwardly of the respective first and second drive members to maintain the pivot point of the pivotal connection equidistant from each of the first and second drive members, the articulated means maintaining the angle between the rotational axes of the first drive member and the pot member equal to the angle between the rotational axes of the second drive member and the pot member to provide constant velocity operation upon relative angular and axial movement between the pot member and the first and second drive members.

2. A double pot-type universal joint comprising a first drive member, a second drive member, each drive member including a pair of opposed trunnions, each trunnion lying in a plane normal to its respective drive member rotational axis, a rotatable member mounted on each trunnion, a pot member drivingly engaging the rotatable members, the first drive member being angularly and axially movable relative to the pot member, means preventing axial movement of the second drive member relative to the pot member while permitting angular movement relative thereto, and articulated means slidably interconnecting the first and second drive members, the articulated means including a pivotal connection and biasing means for maintaining the pivotal connection equidistant between the trunnion planes of each of the first and second drive members during relative angular and axial movement between the pot member and the first and second drive members, the articulated means maintaining the angle between the rotational axes of the first drive member and the pot member equal to the angle between the rotational axes of the second drive member and the pot member to provide constant velocity operation upon relative angular and axial movement between the pot member and the first and second drive members.

References Cited by the Examiner

UNITED STATES PATENTS

| 2,964,928 | 12/1960 | Marquis | 64—8 |
| 2,983,119 | 5/1961 | Glover | 64—21 |
| 3,092,982 | 6/1963 | Wildhaber | 64—21 |

FOREIGN PATENTS

| 925,100 | 3/1947 | France. |
| 377,761 | 8/1932 | Great Britain. |
| 596,945 | 1/1948 | Great Britain. |

FRED C. MATTERN JR., *Primary Examiner.*

HALL C. COE, *Examiner.*